United States Patent Office 3,014,926
Patented Dec. 26, 1961

3,014,926
N-(5-HYDROXYMETHYL - 2 - TETRAHYDROFURFURYL)AMIDES AND DERIVATIVES THEREOF
Harold C. Reynolds, Plainfield, Robert E. Jones, Rahway, and John D. Garber, Westfield, N.J., assignors to Merck & Co., Inc., Rahway, N.J., a corporation of New Jersey
No Drawing. Filed Jan. 5, 1960, Ser. No. 492
7 Claims. (Cl. 260—347.2)

This invention relates to derivatives of 5-hydroxymethylfurfural, and has for its object the provision of a series of tetrahydrofuran compounds and a process of producing these compounds. The compounds of the invention may be represented by the formulae

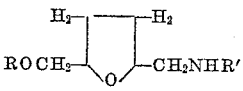

in which R represents hydrogen, sodium sulfate ($SO_3Na$) or $(CH_2CH_2)_nH$ where $n$ is an integer less than 30 and R' represents COR'' or COOR'' and R'' is an alkyl radical having from 5 to 17 carbon atoms. These radicals may be further substituted with halogen, oxygenated and lower alkyl groups.

The compounds have properties making them effective for use as surfactants and for other purposes.

In preparing our novel chemical compounds, we utilize as the starter material 5-(hydroxymethyl)-2-tetrahydrofurfurylamine which may be represented by the following structural formula:

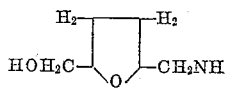

This starting material namely 5-(hydroxymethyl)-2-tetrahydrofurfurylamine is prepared by subjecting 5-hydroxymethylfurfural, a well known compound, to reductive amination as with Raney nickel catalyst and ammonia and recovering 5-(hydroxymethyl)-2-tetrahydrofurfurylamine.

The 5-(hydroxymethyl)-2-tetrahydrofurfurylamine is reacted with a compound of the formulae R''COX or R''COOX wherein R'' is an alkyl group having from 5 to 17 carbon atoms X is halogen. The compounds within the terms of this definition include palmitoyl chloride, stearoyl chloride, layroyl chloride, myristoyl chloride, oleyl chloride, caproyl chloride and mixed fatty acids.

The N-substituted-5-(hydroxymethyl)-2-tetrahydrofurfurylamine compounds produced by the above reaction can be represented as follows:

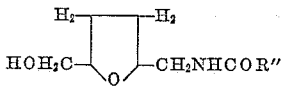

wherein R'' is an alkyl group having from 5 to 17 carbon atoms.

We have found that the above compound can be reacted with an alkylene oxide to form a compound which may be represented by the following formulae:

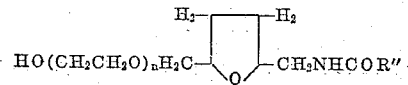

wherein R'' is as above and $n$ is an integer less than thirty.

It has been found that the above compounds possess excellent base properties for nonirritating emollient dishwashing or shampooing compositions.

Alternatively N-substituted-5-(hydroxymethyl)-2-tetrahydrofurfurylamine can be reacted with a sulfating agent to produce a compound of the formulae

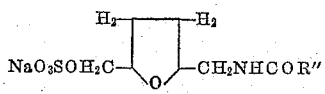

wherein R'' is as above.

The above sulfated compounds have been found to possess excellent properties for heavy duty household detergents.

The following examples are illustrative of processes carried out according to the invention for the production of new compounds.

EXAMPLE 1

*Preparation of N-palmitoyl-5-(hydroxymethyl)-2-tetrahydrofurfurylamine*

To 19.6 gm. of 5-(hydroxymethyl)-2-tetrahydrofurfurylamine prepared as described herein below dissolved in 50 ml. chloroform and cooled in a 3 neck flask, 13.7 gm. palmitoyl chloride was added dropwise to the stirred solution. After all the palmitoyl chloride had been added, the flask was stirred for 10 minutes at 20° C. The solution was washed with 5% sodium carbonate solution. The chloroform was then removed by distillation, leaving a brown paste. On recrystallization from acetone, the product removed was 13.6 gm. of a white waxy solid; M.P. 72.8° C. which analyzed correctly for N-palmitoyl-5-(hydroxymethyl)-2-tetrahydrofurfurylamine.

The starting material 5-(hydroxymethyl)-2-tetrahydrofurfurylamine employed above is prepared by the following procedure:

Fifty grams (0.395 mol.) of 5-hydroxymethyl furfuryl (distilled) was dissolved in 135 cc. of reagent methanol, 20 cc. of liquid ammonia (15.2 g.-0.9 mol.) was added with 1¼ teaspoon of Raney nickel and the mixture placed under 5500–6000 p.s.i. hydrogen pressure. After heating at 150° C. (with shaking) for 10 hours, the mixture was cooled, filtered from the catalyst, and the volatile materials were removed on a steam bath. The dark residue was distilled at 0.08 mu, and the product cut boiled at 76.6–81.8° C. at this pressure. The viscous, water-white liquid, 5(hydroxymethyl)-2-tetrahydrofurfurylamine was recovered.

EXAMPLE 2

*Preparation of 2-(N-palmitoyl)-aminomethyl-5-(W-hydroxyduodecaethoxy) oxymethyl tetrahydrofuran*

To 3.7 gm. (0.01 mol.) of N-palmitoyl-5-(hydroxymethyl)-2-tetrahydrofurfurylamine was added 8.8 gm. (0.2 mol.) of liquid ethylene oxide, exactly 0.008 gm. (0.0002 mol.) sodium hydroxide and exactly 0.004 gm. (0.004 mol.) water. The mixture was placed in a tube which was sealed. The tube was heated at 155° C. for 24 hours, cooled, and cut open. On warming, there was no appreciable evolution of gas. The brown paste remaining in the tube was dissolved in acetone, treated with carbon black, and filtered. The solvent was removed from the filtrate leaving 12.5 gm. yellow paste which was completely soluble in water. In one preparation, the analysis of this paste was C=56.61%; H=8.95%; N=1.15% which corresponded to the condensation of the N-palmitated amino alcohol with between 19 and 20 mols. of ethylene oxide namely 2-(N-palmitoyl)-aminomethyl-5-(W - hydroxyduodecaethoxy)-oxymethyl tetrahydrofuran.

A 0.05% aqueous solution of 2-(N-palmitoyl)-aminomethyl-5-(W-hydroxyduodecaethoxy)-oxymethyl tetrahydrofuran was found to be an excellent base for nonirritating emolient dish washing or shampooing compound. A 0.05% solution in water at 70° C. had a Draves test-time of 25 sec. on a cotton skein. In addition, the solution did not show a cloud point until it was heated to 98° C., well above the normal temperature of dish washing or shampooing solutions.

EXAMPLE 3

*Preparation of N-palmitoyl-2-tetrahydrofurfulylamine-5-oxymethyl-sulfate, sodium salt*

A sulfating mixture was prepared by colling a slurry of 4.35 gm. of urea in 3.24 gm. of formamide to −30° C. and adding thereto 10 gm. of chlorosulfonic acid dropwise. 6.3 g. of this sulfating mixture was added slowly to 12.7 gm. of N-palmitoyl-5-(hydroxymethyl)-2-tetrahydrofurfurylamine dissolved in 100 ml. chloroform and cooled to 20° C. The solution was permitted to stand 18 hours at about 28° C. The resulting light red solution was then neutralized by addition of sodium hydroxide. The solvent was removed leaving a light brown paste, which was thoroughly dehydrated and then dissolved in isopropanol. The isopropanol solution was filtered and then partially distilled. On cooling, a precipitate was formed, which was recovered by filtration yielding 9.3 gm. of a cream colored solid, N-palmitoyl-2-tetrahydrofurfurylamine-5-oxymethyl sulfate, sodium salt which may be represented by the following structural formulae:

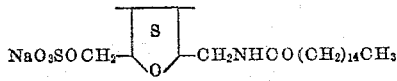

(Na=4.71%). This solid was dissolved readily in water.

The above sulfated compound was an excellent base for a heavy duty household detergent, illustrated as follows:

0.59 gm. of the N-palmitoyl-2-tetrahydrofurfurylamine-5-oxymethyl sulfate sodium salt, 0.66 gm. soda ash and 0.075 gm. sodium carboxymethylcellulose were dissolved in 500 ml. of tap water at 65° C. Standard dirty cotton cloth was substantially lightened in color when washed with this solution. In addition, there was no redeposition of dirt on the white cloth. The washing action was better than the action obtained with commercial alkylated benzene sodium sulfonate when tested in a parallel test.

The wetting action of the detergent base gave a Draves test time of 25 sec. at 70° C. on a standard cotton skein.

EXAMPLE 4

*Preparation of N-stearoyl-5-(hydroxymethyl)-2-tetrahydrofurfurylamine*

A stirred mixture of 67 g. (0.5 mole) of 5-(hydroxymethyl)-2-tetrahydrofurfurylamine, 250 ml. of diethyl ether, and 200 ml. of 10% aqueous sodium hydroxide solution was cooled to −5° C. in a bath of ice methanol. To the well agitated mixture was added a solution of 152 g. (0.5 mole) of stearoyl chloride in 250 ml. of diethyl ether. The addition rate was such that the temperature of the reaction mass was maintained below 0° C. During the addition of the stearoyl chloride, the product precipitated from the solution and an additional 500 ml. of diethyl ether was added to reduce the viscosity of the reaction mass. When the stearoyl chloride addition was complete, the reaction was stirred for two hours, during which time it was permitted to warm to about 20° C. The product was collected on a Buchner funnel and washed with ether. It was dissolved in chloroform and the solution was treated with decolorizing carbon. After being dried over magnesium sulfate, the chloroform solution was evaporated to 500 ml., 150 ml. of petroleum ether was added slowly and the mixture was chilled for about sixteen hours. The product N-stearoyl - 5 - (hydroxymethyl) - 2 - tetrahydrofurfurylamine separated as a waxy solid, M.P. 77–81.5° C. and weighed 170.0 g. (86%).

EXAMPLE 5

*Preparation of polyoxyethylated N-stearoyl-5-(hydroxymethyl)-2-tetrahydrofurfurylamine*

Into a five neck 1 liter flask equipped with a gas inlet tube, thermometer, agitator, pressure vent and a vacuum line were placed 45.0 grams of N-stearoyl-5-hydroxymethyl-2-tetrahydrofurfurylamine. The vessel was heated until the amide had completely melted. The agitator was started and 0.22 g. of pulverized sodium hydroxide was added. The reaction vessel was flushed several times with dry nitrogen gas and the temperature was raised to 150° C. The vessel was evacuated and ethylene oxide gas was introduced at a rate so as to be equal to the rate of reaction. In three hours, 140 gm. (29 mols./mol.) of ethylene oxide were absorbed. The product polyoxyethylated N-stearoyl-5-(hydroxymethyl)-2-tetrahydrofurfurylamine which may be represented by the following structure

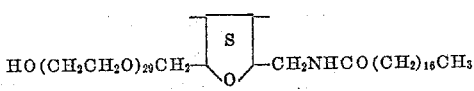

was a dark amber liquid which solidified on standing at room temperature.

The average molecular weight was determined at 1683 by means of a hydroxyl determination and was in agreement with the ethylene oxide content as determined by weight.

An 0.5% aqueous solution of polyoxyethylated N-stearoyl-5-(hydroxymethyl)-2-tetrahydrofurfurylamine was found to be an excellent base for a non-irritating emollient dish washing or shampooing compound. The cloud point of a 0.5% aqueous solution was greater than 98.5° C.

*Preparation of polyoxypropylated N-stearoyl-5-(hydroxymethyl)-2-tetrahydrofurfurylamine and a "block" copolymer*

A similar product was prepared using propylene oxide in place of ethylene oxide. A "block" copolymer using propylene oxide, then ethylene oxide was also prepared.

EXAMPLE 6

*Preparation of N-stearoyl-2-tetrahydrofurfurylamine-5-oxymethyl-sulfate, sodium salt*

A sulfating mixture was prepared by cooling a slurry of 4.35 gm. of urea in 3.24 gm. of formamide to −30° C. and adding thereto 10 gm. of chlorosulfonic acid dropwise. 6.3 g. of this sulfating mixture was added slowly to N-stearoyl-5-(hydroxymethyl)-2-tetrahydrofurfurylamine dissolved in chloroform and cooled to 20° C. The solution was permitted to stand for 18 hours at about 28° C. The resulting solution was then neutralized by addition of sodium hydroxide. The solvent was removed and the resulting paste dehydrated and then dissolved in isopropanol. The isopropanol solution was filtered and then partially distilled. On cooling, a precipitate was formed which was recovered by filtration yielding N-stearoyl-2-tetrahydrofurfurylamine-5-oxymethylsulfate, sodium salt.

To the above sulfated compound was added soda ash, sodium carboxymethylcellulose and water. This mixture was tested and found to be an excellent heavy duty household detergent.

EXAMPLE 7

*Preparation of N-lauroyl-5-(hydroxymethyl)-2-tetrahydrofurfurylamine*

A mixture of 104 g. (0.8 mol.) of 5-hydroxymethyl-2-tetrahydrofurfurylamine, 320 ml. of 10% aqueous sodium hydroxide and 600 ml. of ether was cooled to −5° C. A solution of 170 g. (0.78 mol.) of lauroyl chloride in 300 ml. ether was added dropwise to the well agitated mixture at a rate which maintained the temperature of the reaction below 0° C. As the reaction progressed, the product precipitated from solution. When the acid chloride addition was completed, 200 ml. of chloroform was added to dissolve the product. The organic phase was separated and washed several times with water. It was dried over magnesium sulfate and evaporated under vacuum to a viscous syrup. The syrup was poured into 1500 ml. of petroleum ether and chilled for 48 hours. The product, N-lauroyl-5-(hydroxymethyl)-2-tetrahydrofurfurylamine, was collected by suction filtration, washed with petroleum ether and dried. It weighed 226.0 g. (90%) theory, and melted at 53.5–62.5° C. One recrystallization from acetone gave material of M.P. 57–62° C.

EXAMPLE 8

*Preparation of polyoxyethylated N-lauroyl-5-(hydroxymethyl)-2-tetrahydrofurfurylamine*

Into a five neck 1 liter flask equipped with a gas inlet tube, thermometer, agitator, pressure vent and a vacuum line was placed N-lauroyl-5-(hydroxymethyl)-2-tetrahydrofurfurylamine. The vessel was heated until the amide was completely melted. The agitator was started and pulverized sodium hydroxide was added. The reaction vessel was flushed several times with dry nitrogen gas and the temperature was raised to 150° C. The vessel was evaluated and ethylene oxide gas was introduced at a rate so as to equal the rate of the reaction. The product polyoxyethylated N-lauroyl-5-(hydroxymethyl)-2-tetrahydrofurfurylamine solidified on standing at room temperature.

An 0.5% aqueous solution of polyoxyethylated N-lauroyl - 5 - (hydroxymethyl) - 2 - tetrahydrofurfurylamine was found to be an excellent base for a non-irritating emollient dish washing or shampooing compound.

EXAMPLE 9

*Preparation of N-lauroyl-2-tetrahydrofurfurylamine-5-oxymethyl-sulfate, sodium salt*

A sulfating mixture was prepared by cooling a slurry of 4.35 gm. of urea in 3.24 gm. of formamide to −30° C. and adding thereto 10 gm. of chlorosulfonic acid dropwise. 6.3 g. of this sulfating mixture was added slowly to N-lauroyl-5-(hydroxymethyl)-2-tetrahydrofurfurylamine dissolved in chloroform and cooled to 20° C. The solution was permitted to stand for 18 hours at about 28° C. The resulting solution was then neutralized by addition of sodium hydroxide. The solvent was removed and the resulting paste dehydrated and then dissolved in isopropanol. The isopropanol solution was filtered and then partially distilled. On cooling, a precipitate was formed which was recovered by filtration yielding N - lauroyl - 2 - tetrahydrofurfuylamine - 5 - oxymethyl-sulfate, sodium salt.

To the above sulfated compound was added soda ash, sodium carboxymethylcellulose and water. This mixture was tested and found to be an excellent heavy duty household detergent.

EXAMPLE 10

*Preparation of N-myristoyl-5-(hydroxymethyl)-2-tetrahydrofurfurylamine*

A mixture of 91.3 g. (0.7 mol.) of 5-hydroxymethyl-2-tetrahydrofurfurylamine, 280 ml. of 10% aqueous sodium hydroxide and 550 ml. of ether was cooled to −5° C. A solution of 166 g. (0.67 mol.) of myristoyl chloride in 250 ml. of ethyl ether was added dropwise to the well agitated mixture at a rate which maintained the temperature of the reaction below 0° C. As the reaction progressed, the product precipitated from solution. When the acid chloride addition was completed, 175 ml. of chloroform was added to dissolve the product. The organic phase was separated and washed several times with water. It was dried over magnesium sulfate and evaporated under vacuum to a viscous syrup. The syrup was poured into 1200 ml. of petroleum ether and chilled for 48 hours. The product, N-myristoyl-5-(hydroxymethyl)-2-tetrahydrofurfurylamine, was collected by suction filtration, washed with petroleum ether and dried. It weighed 161.8 g. (90% theory) and melted at 64–67° C.

EXAMPLE 11

*Preparation of polyoxyethylated N-myristoyl-5-(hydroxymethyl)-2-tetrahydrofurfurylamine*

N - myristoyl - 5 - (hydroxymethyl) - 2 - tetrahydrofurfurylamine was treated with ethylene oxide under reaction conditions as described in Example 2 and polyoxyethylated N-myristoyl-5-(hydroxymethyl)-2-tetrahydrofurfurylamine was recovered.

An 0.5% aqueous solution of polyoxyethylated N-myristoyl - 5 - (hydroxymethyl) - 2 - tetrahydrofurfurylamine was found to be a good base for a non-irritating emollient dishwashing or shampooing compound.

EXAMPLE 12

*Preparation of N-myristoyl-2-tetrahydrofurfurylamine-5-oxymethyl-sulfate, sodium salt*

A sulfating mixture was prepared by cooling a slurry of 4.35 gm. of urea in 3.24 gm. of formamide to −30° C. and adding thereto 10 gm. of chlorosulfonic acid dropwise. This sulfating mixture was added slowly to N - myristoyl - 5 - (hydroxymethyl) - 2 - tetrahydrofurfurylamine in accordance with the procedure outlined in Example 3 and N-myristoyl-2-tetrahydrofurfurylamine-5-oxymethyl-sulfate, sodium salt was recovered.

To the above sulfated compound was added soda ash, sodium carboxymethylcellulose and water. This mixture was tested and found to be an excellent heavy duty household detergent.

EXAMPLE 13

*Preparation of N-oleyl-5-(hydroxymethyl)-2-tetrahydrofurfurylamine*

To a mixture of 5-(hydroxymethyl)-2-tetrahydrofurfurylamine in aqueous sodium hydroxide and ether was added 200 g. of (0.67 mol.) of oleyl chloride. N-oleyl-5-(hydroxymethyl)-2-tetrahydrofurfurylamine having a melting point of 20–25° C. was recovered in a 90% yield.

EXAMPLE 14

*Preparation of N-oleyl-2-tetrahydrofurfurylamine-5-oxymethyl-sulfate, sodium salt*

A sulfating mixture was prepared by cooling a slurry of 4.35 gm. of urea in 3.24 gm. of formamide to −30° C. and adding thereto 10 gm. of chlorosulfonic acid dropwise. This sulfating mixture was added slowly to N-oleyl-5-(hydroxymethyl)-2-tetrahydrofurfurylamine in accordance with the procedure outlined in Example 3 and N-oleyl-2-tetrahydrofurfurylamine - 5 - oxymethyl-sulfate, sodium salt was recovered.

To the above sulfated compound was added soda ash, sodium carboxymethylcellulose and water. This mixture was tested and found to be an excellent heavy duty household detergent.

EXAMPLE 15

*Preparation of oleate salt of 5-(hydroxymethyl)-2-tetrahydrofurfurylamine*

Oleic acid was neutralized with 5-(hydroxymethyl)-2-tetrahydrofurfurylamine to produce the oleate salt of 5-(hydroxymethyl)-2-tetrahydrofurfurylamine which can be represented by the formulae

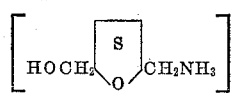

The oleate salt of 5-(hydroxymethyl)-2-tetrahydrofurfurylamine has been found to be an excellent emulsifying agent and detergent. A 0.1% solution of this salt was made with warm water containing 50 p.p.m. hardness (as CaCO₃). Cotton cloth dirtied to a reflectance of 46.5% was washed in the oleic acid soap solution. It then had a reflectance value of 57.0%. A second piece of the same dirtied cloth was washed under identical conditions in commercial sodium lauryl sulfate solution and had a reflectance value of 52.5%. Under these conditions washing with commercial sodium alkyl naphthalene sulfonate gave a reflectance value of 55%. Other simple soaps derived from the 5-hydroxymethyl-2-tetrahydrofurfurylamine plus an equimolar amount of fatty acid (caproic to stearic) showed surfactant properties also.

EXAMPLE 16

*Preparation of N-caproyl-5-(hydroxymethyl)-2-tetrahydrofurfurylamine*

To a mixture of 5-(hydroxymethyl)-2-tetrahydrofurfurylamine in aqueous sodium hydroxide and ether was added 89 g. (0.67 mol.) N-caproyl-5-(hydroxymethyl)-2-tetrahydrofurfurylamine having a melting point of 38–46° C. was recovered.

EXAMPLE 17

*Preparations of mixed fatty acids*

Mixed fatty acids derived from coconut oil and tall oil were converted to fatty acid by treatment with a fatty acid chloride as described in Example 1.

Sulfation as described in Example 3 and ethylene oxide or propylene oxide treatment of the primary hydroxyl group as described in Example 2 resulted in the expected products.

What is claimed is:

1. The compound represented by the formula

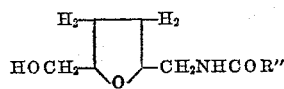

wherein R″ is selected from the group consisting of an alkyl radical having from 5 to 17 carbon atoms.

2. The compound represented by the formula

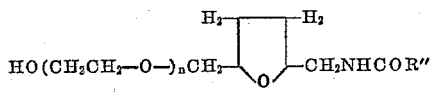

wherein R″ is selected from the group consisting of an alkyl radical having from 5 to 17 carbon atoms, and $n$ represents an integer less than 30.

3. The compound represented by the formula

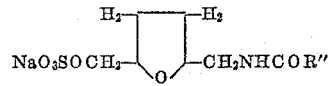

wherein R″ is selected from the group consisting of an alkyl radical having from 5 to 17 carbon atoms.

4. The compound represented by the formula

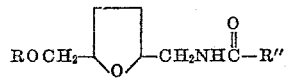

wherein R is selected from the group consisting of H,

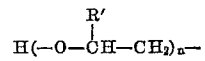

and (NaO₃S)—, R′ is selected from the group consisting of hydroxy and lower alkyl, R″ is an alkyl group selected from the group consisting of alkyl radicals having from 5 up to 17 carbon atoms and $n$ is an integer less than 30.

5. A compound represented by the formula

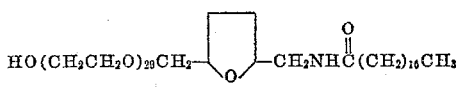

6. The compound represented by the formula

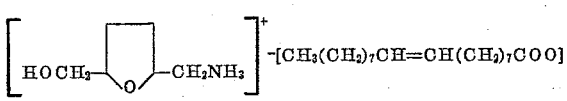

7. The compound represented by the formula

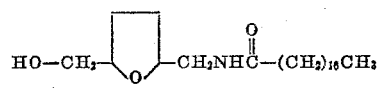

No references cited.